US006791909B2

(12) United States Patent
Takenaka

(10) Patent No.: US 6,791,909 B2
(45) Date of Patent: Sep. 14, 2004

(54) OPTICAL DISC REPRODUCING APPARATUS

(75) Inventor: Kazuma Takenaka, Shirakawa (JP)

(73) Assignee: Denon, Ltd., Tokyo (JP)

( * ) Notice: Subject to any disclaimer, the term of this patent is extended or adjusted under 35 U.S.C. 154(b) by 144 days.

(21) Appl. No.: 10/101,216

(22) Filed: Mar. 20, 2002

(65) Prior Publication Data
US 2002/0136098 A1 Sep. 26, 2002

(30) Foreign Application Priority Data

Mar. 23, 2001 (JP) ........................................ 2001-085364

(51) Int. Cl.$^7$ .............................................. G11B 21/08
(52) U.S. Cl. .................................. 369/30.09; 369/30.3
(58) Field of Search ........................ 369/30.08, 30.09, 369/60.28, 30.29, 30.3, 30.06; 386/125, 126

(56) References Cited

U.S. PATENT DOCUMENTS

| | | | | |
|---|---|---|---|---|
| 4,817,075 A | * | 3/1989 | Kikuchi et al. | 369/47.13 |
| 4,949,322 A | * | 8/1990 | Kimura et al. | 369/178.01 |
| 5,051,971 A | * | 9/1991 | Yamagishi et al. | 369/30.09 |
| 5,051,973 A | * | 9/1991 | Shiba et al. | 369/30.06 |
| 5,394,384 A | * | 2/1995 | Aoyagi et al. | 369/30.24 |
| 5,638,346 A | | 6/1997 | Aramaki | |
| 5,802,018 A | * | 9/1998 | Kim et al. | 369/30.28 |
| 6,157,597 A | * | 12/2000 | Fleming, III | 369/30.3 |
| 6,320,827 B1 | | 11/2001 | Otsuka | |
| 6,388,958 B1 | * | 5/2002 | Yankowski | 369/30.06 |

FOREIGN PATENT DOCUMENTS

| | | |
|---|---|---|
| EP | 1 058 251 A2 | 12/2000 |
| JP | 10-275407 | 10/1998 |
| JP | 2000-285580 | 10/2000 |
| JP | 2000-353353 | 12/2000 |

OTHER PUBLICATIONS

K. Vijayan, "ATAPI Music CD Programming Interface in Linux," Hello World, Apr. 1999, pp. 1–7.
D. Jewell, "Completing Your Audio CD Player," PCPLUS, No. 176, May 2001, pp. 198–199.
Panasonic, "Operating Instructions DVD/CD Player: DVD–CV40," Panasonic, Apr. 2000, pp. 1–44.

\* cited by examiner

Primary Examiner—Tan Dinh
(74) Attorney, Agent, or Firm—Dickstein Shapiro Morin & Oshinsky LLP

(57) ABSTRACT

When an instruction to enter information unqualified for programmed reproduction is accepted, an optical disc reproducing apparatus according to the present invention gives a notification indicating that that information cannot be entered in a program.

The disc detection unit 204 detects and decides a type of each optical disc, whether or not the disc can be entered in the program, and also detects the largest track number, the system controller 501 directs the disc information memory unit 502 to store the types of optical discs, information about possibility of entry in the program, and the largest track number associated with disc accommodation locations. When entering into the program the contents accepted from the operation keys on the user interface block unit 6, the system controller 501 refers to the disc information memory unit 502, and if it finds that an accepted instruction is requesting an optical disc or a track number which cannot be entered in the program, it outputs a notification indicating that the disc cannot be entered, on the display of the user interface block unit 6.

8 Claims, 9 Drawing Sheets

FIG.2A

| DISC ACCOMMODATION LOCATION NO. | KIND OF DISC | PROGRAM ENTRY YES/NO FLAG | RECORD TIME OF EACH TRACK (MUSIC) |
|---|---|---|---|
| No1 | CD | 1(YES) | 1. ○○MIN. ××SEC.<br>2. ○○MIN. ××SEC.<br>3. ○○MIN. ××SEC. |
| No2 | CD | 1(YES) | 1. ○○MIN. ××SEC.<br>2. ○○MIN. ××SEC.<br>3. ○○MIN. ××SEC. |
| No3 | DVD | 0(NO) | |
| No4 | | | |
| No5 | | | |

FIG.2B

| DISC ACCOMMODATION LOCATION NO. | KIND OF DISC | PROGRAM ENTRY YES/NO FLAG | RECORD TIME OF EACH TRACK (MUSIC) |
|---|---|---|---|
| No1 | CD | 1(YES) | 1. ○○MIN. ××SEC.<br>2. ○○MIN. ××SEC.<br>3. ○○MIN. ××SEC. |
| No2 | CD | 1(YES) | 1. ○○MIN. ××SEC.<br>2. ○○MIN. ××SEC.<br>3. ○○MIN. ××SEC. |
| No3 | DVD | 0(NO) | |
| No4 | CD | 1(YES) | 1. ○○MIN. ××SEC.<br>2. ○○MIN. ××SEC.<br>3. ○○MIN. ××SEC. |
| No5 | CD | 1(YES) | 1. ○○MIN. ××SEC.<br>2. ○○MIN. ××SEC.<br>3. ○○MIN. ××SEC. |

FIG.3A

| DISC ACCOMMODATION LOCATION NO. | TRACK (MUSIC) |
|---|---|
| No3 | MUSIC OF SELECTED TRACK NOs. (3-8) CANNOT BE PUT IN PROGRAM |

FIG.3B

| DISC ACCOMMODATION LOCATION NO. | TRACK (MUSIC) |
|---|---|
| No2 | MUSIC OF SELECTED TRACK NO. (2) IS NON-EXISTENT AND CANNOT BE PUT IN PROGRAM |

FIG.4A

| DISC ACCOMMODATION LOCATION NO. | TRACK (MUSIC) | | DISC ACCOMMODATION LOCATION NO. | TRACK (MUSIC) | |
|---|---|---|---|---|---|
| | NO. | RECORDING TIME (MIN.) | | NO. | RECORDING TIME (MIN.) |
| No1 | 1 | 10 | No2 | 1 | 15 |
| | 2 | 7 | | 2 | 15 |
| | 3 | 4 | | 3 | 10 |
| | 4 | 8 | | | |
| | 5 | 11 | | | |

FIG.4B

| DISC ACCOMMODATION LOCATION NO. | TRACK (MUSIC) | | DISC ACCOMMODATION LOCATION NO. | TRACK (MUSIC) | |
|---|---|---|---|---|---|
| | NO. | RECORDING TIME (MIN.) | | NO. | RECORDING TIME (MIN.) |
| No1 | 1 | 10 | No2 | 1 | 15 |
| | 2 | 7 | | 2 | 15 |
| | 3 | 4 | | 3 | 10 |
| | 4 | 8 | | | |
| | 5 | 11 | | | |

| DISC ACCOMMODATION LOCATION NO. | TRACK (MUSIC) | | DISC ACCOMMODATION LOCATION NO. | TRACK (MUSIC) | |
|---|---|---|---|---|---|
| | NO. | RECORDING TIME (MIN.) | | NO. | RECORDING TIME (MIN.) |
| No4 | 1 | 8 | No5 | 1 | 7 |
| | 2 | 10 | | 2 | 6 |
| | 3 | 12 | | 3 | 9 |
| | 4 | 10 | | 4 | 8 |
| | | | | 5 | 10 |

FIG.8

| REPRODUCING ORDER | DISC ACCOMMODATION LOCATION NO. | TRACK NO. | CUMULATIVE TOTAL OF REPRODUCING TIME |
|---|---|---|---|
| 1 | No. 2 | 2 | 15 |
| 2 | No. 4 | 4 | 25 |
| 3 | No. 1 | 2 | 32 |
| 4 | No. 4 | 1 | 40 |
| 5 | No. 5 | 1 | 47 |
| 6 | No. 5 | 6 | 57 |

FIG.9

| DISC ACCOMMODATION LOCATION NO. | ERROR MESSAGE |
|---|---|
| NO.3 | CANNOT BE ENTERED IN PROGRAM |

OPTICAL DISC REPRODUCING APPARATUS

BACKGROUND OF THE INVENTION

1. Field of the Invention

The present invention relates to an optical disc reproducing apparatus capable of accommodating a single optical disc or a plurality of optical discs, selecting a specified optical disc, and reproducing information recorded on the optical disc.

2. Prior Art

In the conventional optical disc reproducing apparatuses, there are known types which include a disc changer in which a plurality of optical discs can be accommodated. A block diagram of an optical disc reproducing apparatus in the prior art is shown in FIG. 7. In FIG. 7, the optical disc reproducing apparatus comprises a mechanical unit 710 having an optical pickup unit 711, a signal processing unit 720 for demodulating data from signals detected by the optical pickup unit 711, an application block unit 730 for decoding a main video signal, a sub-picture signal and audio signals from data output from the signal processing unit 720, an output unit 740 for outputting decoded video signals and audio signals to external devices, a system controller unit 750 for controlling the operation of the optical disc reproducing apparatus, a user interface block unit 760 for operation and display, and a roulette block unit 770 for accommodating one or more optical discs, selecting a specified optical disc, and transferring the selected optical disc to the mechanical unit 710.

Description will be made of a program reproducing procedure of a conventional optical disc reproducing apparatus. FIG. 6 is a flowchart for explaining the program reproducing procedure of the conventional optical disc reproducing apparatus.

According to FIG. 6, the power supply to the optical disc reproducing apparatus is turned on (ST101). After the power supply is turned on, when the user instruction is received through the program entry mode button on the user interface block unit 760, the apparatus is set in the program entry mode (ST102), and the contents entered in the program are accepted (ST103). When information recorded on an optical disc is reproduced on the optical disc reproducing apparatus, the roulette block unit 770 transfers the optical disc to the mechanical unit 710, and the type of the optical disc specified by the reproduction program is detected to find whether the disc is a CD (Compact Disc) or a DVD (Digital Versatile Disc) by a signal detected by the optical pickup. Unless the type of the optical disc is determined correctly, the information recorded on the optical disc cannot be read correctly (ST104). By reading disc information recorded on the optical disc, it is possible to decide whether the program-entered optical disc is a CD or a DVD. There is another way of deciding whether an optical disc is a CD or a DVD without reading disc information, an example of which is disclosed in JP 10-275407. In this prior art, in focus search of an optical disc, a shift in the focus position due to a difference in disc thickness is detected, and a decision is made whether the disc is a CD or a DVD.

In FIG. 6, after the type of an optical disc entered in the program is decided, the signal processing circuits are switched over from one circuit to another in accordance with the type of the optical disc, and the optical disc entered in the program starts to be reproduced (ST105)(ST106). When reproduction of the optical disc entered in the program is finished, the system controller unit 750 controls the roulette block unit 770 to rotate the roulette, and selects and reproduces the next program-entered optical disc. The subsequent procedure is a repetition of the above mentioned procedure (ST107)(ST108).

Meanwhile, some DVDs or CDs have an interactive function to make reproduction taken place by interaction between the operator and the reproducing apparatus. Among CDs, a CD-I (Compact Disc-Interactive media) is one such example, and among DVDs, there are some which have a multistory function. In the case of an optical disc with an interactive function, unless the operator presses an operation button on the user interface block unit 6, disc reproduction does not continue.

In the above-mentioned prior art, when an optical disc with such an interactive function is loaded, reproduction moves forward by interaction between the user and the reproducing apparatus, and therefore it often happens that the program enters a temporary halt state waiting for an instruction from the user, and reproduction remains stopped even though the program is supposed to be continuously reproduced. To preclude such a temporary halt, it is possible to make a setting so that when an optical disc with an interactive function is entered in the program, if a temporary halt occurs, reproduction on the optical disc at issue is not continued but a switchover is made to reproduction of the next program-entered optical disc. However, because the reproduction of the program-entered optical disc is terminated, the actual reproduction time becomes shorter than a total reproduction time set in the program. To take an example, when music played back on the optical disc reproducing apparatus is broadcast as BGM in a shop, if a track on an optical disc with an interactive function is entered in the program, this interactive optical disc is not reproduced, but the next program-entered disc is reproduced, and reproduction comes to an end earlier than the time that was planned, a fact which nobody notices and time passes without BGM. For this reason, the user has to manage the programmed reproduction by optical disc reproducing apparatus all the time, thus increasing a burden on the user.

SUMMARY OF THE INVENTION

To solve the above problem, the present invention has been made and has as its object to provide an optical disc reproducing apparatus capable of correctly reproducing program contents entered by the user by eliminating chances for the user to enter, in a reproduction program, information in optical discs having an interactive function or tracks that are not recorded on exist in the optical disc, when the user enters a reproduction program.

To achieve the above object, according to a first aspect of the present invention, an optical disc reproducing apparatus capable of accommodating a plurality of optical discs and reproducing information recorded on an optical disc in a specified accommodation location, comprises disc detecting means for detecting a type of the optical discs to decide whether or not the disc can be entered in a program; disc type memory means for storing detection results of the disc detecting means associated with disc accommodation location information indicating disc accommodation locations of respective discs; accepting means for accepting an instruction to enter information recorded on the optical disc in the program to specify a reproducing order of the information; output means, when referring to the decision results stored in the disc type memory means, if the information specified by the instruction accepted by the accepting means is information recorded on an optical disc that cannot be entered in the program, for outputting a notification indicating that the information cannot be entered in the program.

According to a second aspect of the present invention, an optical disc reproducing apparatus capable of accommodating a plurality of optical discs and reproducing information recorded on an optical disc in a specified accommodation location comprises track number obtaining means for obtaining the largest track number of information recorded on the optical disc; disc track memory means for storing the largest track number obtained by the track number obtaining means associated with disc accommodation location information indicating disc accommodation locations of respective discs; accepting means for accepting an instruction to enter the track of information recorded on the optical disc in a program to specify a reproducing order of tracks; and output means for referring to the largest track number stored in the disc track memory means, and outputting a notification indicating that a track cannot be entered in the program when the track number of the track specified in the instruction accepted by the accepting means is larger than the largest track number.

According to the present invention, it is possible to correctly reproduce program contents entered by the user by eliminating chances for the user to enter, in a reproduction program, information in optical discs having an interactive function or tracks that are not recorded on the optical disc, when the user enters a reproduction program.

BRIEF DESCRIPTION OF THE DRAWINGS

FIG. 2A shows contents stored in the disc information memory unit 502 according to the embodiment of the present invention;

FIG. 2B shows contents stored in the disc information memory unit 502 according to the embodiment of the present invention;

FIG. 3A shows an example of displayed image of a notification to the user that a selected track cannot be entered in the program according to the embodiment of the present invention;

FIG. 3B shows an example of displayed image of a notification to the user that a selected track cannot be entered in the program according to the embodiment of the present invention;

FIG. 4A is an explanatory diagram showing an example of displayed image of tracks that can be entered in the program according to the embodiment of the present invention;

FIG. 4B is an explanatory diagram showing an example of displayed image of tracks that can be entered in the program according to the embodiment of the present invention;

FIG. 8 is an explanatory diagram of contents stored in the program storage unit 503 and an example of displayed image according to the embodiment of the present invention; and FIG. 9 is an explanatory diagram showing an example of displayed image of a notification to the user that a selected disc cannot be entered according to the embodiment of the present invention.

DETAILED DESCRIPTION OF THE PREFERRED EMBODIMENTS

Embodiments of the present invention will be described with reference to the accompanying drawings.

Figure 1:
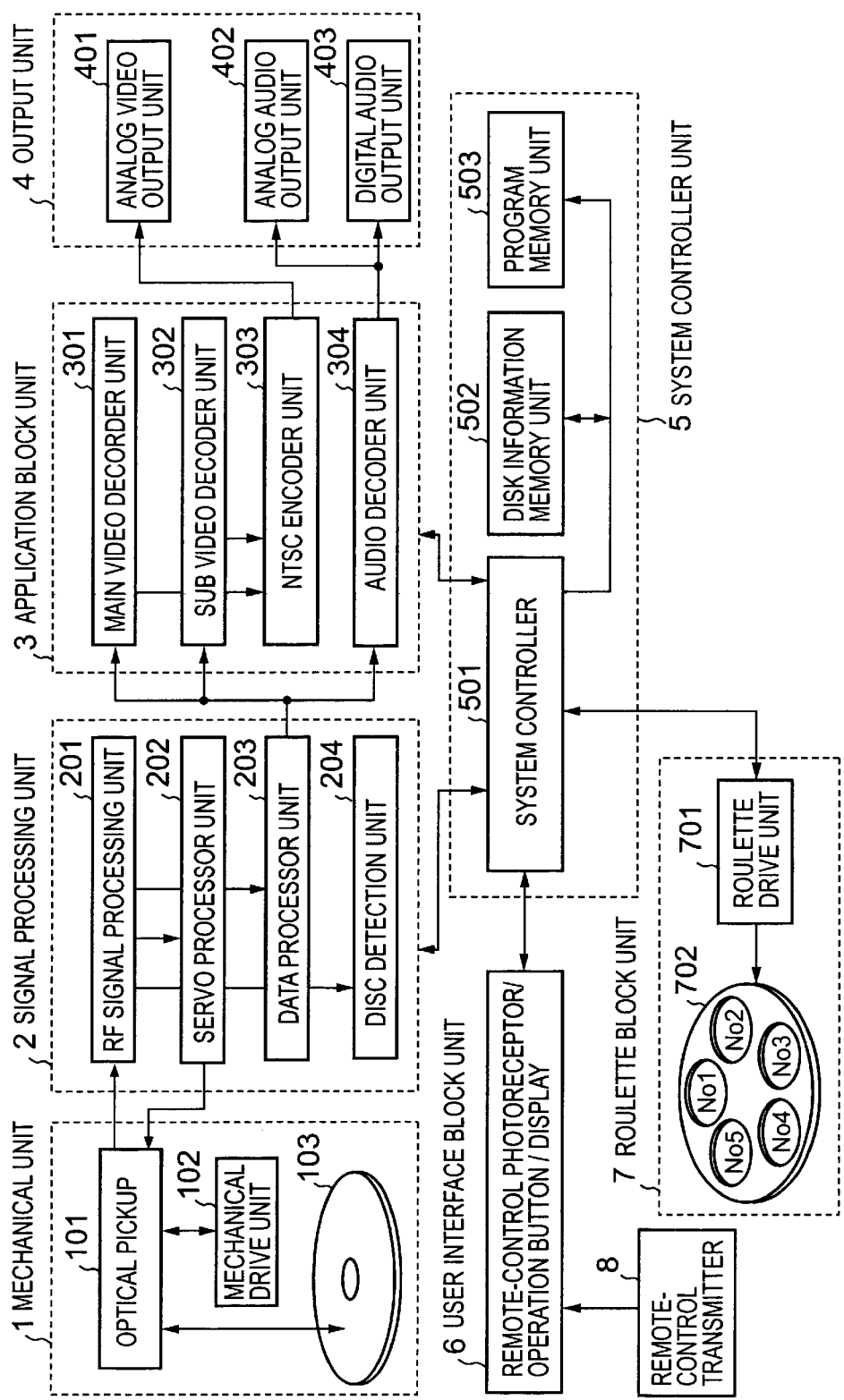
FIG. 1 is a block diagram of an optical disc reproducing apparatus according to an embodiment of the present invention.

An optical disc reproducing apparatus according to an embodiment of the present invention is described in the following. FIG. 1 is a block diagram showing a configuration of an optical disc reproducing apparatus according to this embodiment.

In FIG. 1, the optical disc reproducing apparatus comprises a mechanical unit 1, a signal processing unit 2, an application block unit 3, an output unit 4, a system controller unit 5, a user interface block unit 6, and a roulette block unit 7.

The mechanical unit 1 comprises an optical pickup unit 101 for detecting a record signal recorded on an optical disc 103, and a mechanical drive unit 102 having a slide motor and a spindle motor mounted therein.

The signal processing unit 2 comprises an RF signal processing unit 201 for amplifying a record signal detected by the optical pickup 101 and detecting an error signal, a servo processor unit 202 for controlling the optical pickup and the slide motor and the spindle motor, a data processor unit 203 for demodulation and error correction of record data output by the RF signal processing unit 201, a disc detection unit 204 for detecting a type of optical discs.

The application block unit 3 comprises a main video decoder unit 301 for decoding a main video signal output from the signal processing unit 2, a sub picture decoder unit 302 for decoding a sub picture signal, an NTSC encoder unit 303 for converting the mixed video signal of the main video signal output from main video decoder and the sub picture signal output from the sub picture decoder unit 302 into an NTSC format video signal, and an audio decoder unit 304 for decoding audio data.

The output unit 4 amplifies the video signal and the audio signal output from the application block unit 3, and outputs those signals to the outside. The system controller unit 5 controls the operation of the optical disc reproducing apparatus. The user interface block unit 6 comprises operation keys to instruct the optical disc reproducing apparatus to operate, a remote-control photoreceptor for receiving signals from remote-control unit, and a display unit for displaying operating states of the optical disc reproducing apparatus. The roulette block unit 7 comprises a roulette 702 for accommodating a plurality of optical discs and a roulette drive unit 701 for driving the roulette 702, and the roulette drive unit 701 selects a specified optical disc and transfers it to the mechanical unit.

According to this embodiment, in the optical disc reproducing apparatus capable of accommodating a plurality of optical discs and reproducing information recorded on an optical disc in a specified accommodation location, a program specifying a reproducing order of information recorded on an optical disc is accepted by operation keys on the user interface block unit 6 as the accepting means. The operation keys include a program entry button to accept entries of contents in the program, disc selector buttons to accept selected accommodation locations of discs to be reproduced, track selector buttons to accept selected track numbers to be reproduced, and a ten key pad. The system controller 501 as the control means stores a reproducing order of information entered by using the operation keys on the user interface block unit 6 as a reproduction program in the program memory unit 503, and the system controller 501 reproduces information according to the reproduction program stored in the program memory unit 503 when it accepts an instruction to play the program.

On the other hand, the disc detection unit 204, when an optical disc is accommodated into the roulette block unit 702, detects the type of the optical disc, and decides whether or not the optical disc can be entered in the program. The disc detection unit 204, from a predetermined area of each optical disc, obtains the track number of each track of information recorded on the optical disc and a recording time of each track (hereafter the track number and the recording time of each track are referred to as track information). The system controller 501 controls the disc information memory unit 502 to store the type of the optical disc detected by the disc detection unit 204, yes/no information about disc entry into the reproduction program, and track information by associating those items with disc accommodation location information (hereafter referred to as disc accommodation location number) indicating the accommodated position of the optical disc on the roulette 702.

When the reproducing order accepted through the operation keys on the user interface block unit 6 is entered in the reproduction program, the system controller 501 refers to the information stored in the disc information memory unit 502, and if the optical disc specified by an instruction so as to be entered in the program is an optical disc which cannot be entered in the program, a notification indicating that the specified optical disc cannot be stored in the program is output on the display of the user interface block unit 6 or is output audibly from an analogue audio output unit 402. If the optical disc specified by an instruction so as to be entered in the program has a track number that cannot be entered in the program, a notification indicating that track of the specified optical disc cannot be entered in the program is output on the display of the user interface block unit 6 or is output audibly from an analogue audio output unit 402 by voice output.

The functions of the respective units will be described in the following.

The mechanical unit 1 comprises a pickup feed mechanism for moving pickup unit 101 in the radial direction of the optical disc, a mechanical drive unit 102 of a disc loading mechanism to transfer an optical disc 103 from the roulette 702 onto a turntable of the spindle motor, and the optical pickup 101 for detecting recording information recorded on the optical disc 103 on the turntable of the spindle motor.

The optical pickup 101 includes a red laser diode, and an optical parts for irradiating a laser beam emitted from the laser diode to the recording surface of the optical disc 103, and a photodetector for detecting the laser beam reflected from the optical disc, and a current-voltage conversion circuit for converting a signal of an extremely low photocurrent detected by the photodetector into a voltage.

The user interface block unit 6 comprises a display device, such as a vacuum fluorescent display to display the operating state of the optical disc reproducing apparatus, an operation button to instruct the optical disc reproducing apparatus to operate, and a remote-control photoreceptor, and is provided with a signal interface function to demodulate a signal received by the remote-control photoreceptor and transfer the signal to the system controller 501 of the system controller unit 5. The operation keys are used to accept contents to be entered in the program. The operation keys include a program entry button to accept entries of contents in the program, disc selector buttons to accept selected accommodation locations of discs to be reproduced, track selector buttons to accept selected track numbers to be reproduced, and a ten key pad.

The roulette block unit 7 comprises a roulette 702 accommodating a single optical disc or a plurality of optical discs, and a roulette drive unit 701 for rotatably driving the roulette 702, and the roulette 701 is controlled in rotation by the system controller 501 of the system controller unit 5.

The signal processing unit 2 has four blocks as shown below.

(1) RF Signal Processor Unit 201

The RF signal processor unit 201 comprises a waveform equalization circuit for restoring a signal detected by the optical pickup 101 to such a waveform as to be correctly detectable, and detects servo error signals to control the optical pickup, such as a tracking error signal and a focusing error signal, from a signal output from the waveform equalization circuit. The RF signal processor unit drives a current flowing through the laser diode so that the light emission output of the laser diode may be at an appropriate level.

(2) Servo Processor Unit 202

The servo processor unit 202 controls the tracking servo and focus servo of the optical pickup 101, slide-motor servo, and CLV (Constant Linear Velocity) servo of the spindle motor to keeps the linear velocity of the optical disc 103 constant.

(3) Data Processor Unit 203

The data processor unit 203 demodulates reproduced signal by using 8-14 demodulation for converting the 14-bit signal detected from a CD to 8-bit data and executes error correction by CIRC (Cross Interleave Read Solomon Code). Moreover, the data processor unit 203 corrects errors in reproduced data by using 8-14 demodulation for converting the 16-bit signal detected from a DVD to 8-bit data and executes error correction by RS-PC (Read Solomon Product Code).

(4) Disc Detection Unit 204

The disc detection unit 204 determines a disc type of each optical disc 103 to see whether it is a CD or a DVD by checking a focus signal output from the RF signal processor unit 201. There are physical structural differences between CDs and DVDs. For example, because there is a difference in substrate thickness, focus error signals from a CD and a DVD are different in waveform. By utilizing this difference in waveform, optical discs are discriminated between CDs and DVDs.

After an optical disc is determined to be a CD or a DVD, the optical disc is checked if it is an interactive type or not by reading management information about the optical disc.

More specifically, if the optical disc is determined to be a CD, for example, whether there is the interactive function or not can be decided by whether it is possible to read TOC (Table of Contents) information recorded in the format of a CD-DA (Compact Disc-Digital Audio). In other words, if TOC information in the CD-DA format can be read, a decision is made that the CD is a CD-DA without the interactive function, so that the information recorded on the CD can be entered in the reproduction program. If TOC information in the CD-DA format cannot be read, a decision is made that the CD is likely to be a CD with the interactive function, so the information recorded on the CD cannot be entered in the reproduction program. Needless to say, the checking method is not limited to this.

If a decision is made that the optical disc is a DVD, the search-prohibit flag, which is recorded in the PGCI (Program Control Information) that records DVD management information is read. If all the search-prohibit flags are off, a decision is made that the DVD is a DVD which has not interactive function. In other words, it is decided that information recorded on the DVD can be entered in the reproduction program. If any search-prohibit flag is on, a decision is made that the DVD is a DVD with the interactive function, and it is decided that information recorded on the DVD cannot be entered in the reproduction program. Also with DVDs, the checking method is not limited to the one described above.

The disc detection unit 204, when it decides that the disc is a CD-DA, reads TOC information from the CD through the servo processor unit 202 and the optical pickup 101, so as to obtain track information. The disc detection unit 204, when it decides that the disc is a DVD, reads video manager (VMG) of the DVD through the servo processor unit 202 and the optical pickup 101, so as to obtain track information recorded therein.

The system controller unit 5 comprises a system controller 501 for controlling the operation of the various units of the optical disc reproducing apparatus, a disc information memory part 502 for storing the accommodation location numbers of discs in the roulette 702 accommodating an optical disc 103, a type of optical disc, and a reproducing order of optical discs in the reproduction program, and a program memory unit 503 for storing contents of the program.

The disc information memory unit 502 stores information about a type of optical disc (disc type detection information) detected by the disc detection unit 204, yes/no information about disc entry into the reproduction program, and track information by associating those pieces of information with the accommodation location numbers of the disc.

When the disc detection unit 204 detects the type of an optical disc and yes/no information about entry into the reproduction program, and also obtains track information, the system controller 501 controls the disc information memory unit 502 to store disc type detection information, yes/no information about entry into the reproduction program, and track information. Here, yes/no information about disc entry into the reproduction program is stored as a flag which is set to 1 when entry is possible and 0 when entry is impossible (hereafter, this flag is referred to as a program entry yes/no flag).

FIGS. 2A and 2B show contents stored in a disc information memory unit 502. FIG. 2A shows the contents stored in the disc information memory unit 502 when CDs without the interactive function are placed in the disc accommodation locations No.1 and No.2 respectively, and a DVD with the interactive function is placed in the disc accommodation location No.3 on the roulette 702 in a 5-disc-changer reproducing apparatus according to the present embodiment. The disc information memory unit 502 stores the disc accommodation location numbers, types of discs, program entry yes/no flag and track information associated with one another.

As shown in FIG. 2A, the system controller 501 determines that the optical disc placed in the accommodation location No.1 is a CD, and stores it as a CD in the disc information memory unit 502. Because the disc does not have the interactive function, the system controller 501 decides that information recorded on the disc can be entered in the program, and sets the program entry flag to 1. Then, the system controller 501 obtains track information from TOC information, and enters the recording time of each track. This procedure is performed also for the disc at the accommodation location No.2. In addition, the system controller 501 checks the optical disc stored in the accommodation location No.3, decides that the disc is a DVD, and enters it as a DVD in the disc information memory unit 502. Because this DVD has the interactive function, it decides that the DVD cannot be entered in the program and sets the program entry yes/no flag to 0. The system controller stores the track information read from VMG information in the disc information memory unit 502.

A number of tracks of information recorded on an optical disc is determined by track numbers in track information stored in the disc information memory unit 502, namely, the largest track number entered in the track information is the number of tracks of information recorded on the optical disc. When a program is prepared, if a track number larger than the largest track number is specified, it is decided that the specified track number does not exist.

FIG. 2B shows an example of data stored in the disc information memory unit 502 when an optical disc in the disc accommodation location No.3 has the interactive function among optical discs placed in the disc accommodation locations No.1 through No.5 on the roulette in a 5-disc-changer reproducing apparatus according to the present embodiment.

The program memory unit 503 stores a reproducing order entered through the operation keys on the user interface block unit 6 as a reproduction program. FIG. 8 shows data stored in the program memory unit 503 as an example. In FIG. 8, the program memory unit 503 stores data, such as disc accommodation location numbers, track numbers and the cumulative total of reproducing time associated with one another in the reproducing order stored in the reproduction program.

When the program entry button, which is included in the operation keys on the user interface block unit 6, is pressed and an optical disc is selected through a disc selector button, then, the system controller 501 refers to the program entry yes/no flag of the corresponding optical disc stored in the disc information memory unit 502 to decide whether the selected optical disc can be entered in the program. When program entry yes/no flag is set to "1" (yes), the operation of the track selector button is prompted.

If the program entry yes/no flag is set to "0" (no), the system controller 501 decides that the optical disc cannot be entered into the reproduction program, outputs an error message on the display of the user interface 6 to notify to the user that the optical disc cannot be entered in the program as shown in FIG. 9. A notification indicating that the optical disc cannot be entered in the program can be given by outputting a beep sound or an error message can be given by voice output from the analog audio output unit 402.

Then, when a track number to be entered in the program is selected by the track selector button included in the operation keys on the user interface block unit 6, the system controller 501 refers to the track information of the corresponding optical disc entered in the disc information memory unit 502 to decide whether the selected track number can be entered in the program. If the selected track number exists, in other words, if the selected track number is equal to or smaller than the entered largest track number, the system controller 501 stores the selected track number as the one that can be entered in the program in the program memory unit 503 together with the disc accommodation location number of that optical disc.

If the selected track number is not stored, in other words, if the selected track number is larger than the largest track number, the system controller 501 decides that the track number cannot be entered in the program, and does not stores the selected track number in the program memory unit 503 because this track number cannot be entered in the program. In this case, as shown in FIGS. 3A and 3B, the system controller 501 outputs an error message on the display of the user interface block unit 6 to notify to the user that the selected track cannot be entered in the program. Here, it is possible to give this notification by outputting a beep sound or giving an error message by voice output from the analog audio output unit 402.

When the program entry button is pressed, the system controller 501 may outputs the accommodation location numbers of optical discs and the track numbers in the optical discs that can be entered in the program on the display of the user interface block unit 6 as shown in FIGS. 4A and 4B.

FIG. 4A shows an example of displayed image of the disc accommodation location number of optical discs and track numbers that can be entered in the program, when CDs without the interactive function are in the disc accommodation location numbers No.1 and No.2 and a DVD with the interactive function is in the accommodation location No.3 on the roulette in the 5-disc-changer reproducing apparatus as shown in FIG. 2A.

FIG. 4B shows a displayed image of optical discs and tracks that can be entered in the program, when a DVD with the interactive function is located in the disc accommodation location number No.3 and CDs without the interactive function are located in the other disc accommodation location numbers on the roulette in the 5-disc-changer reproducing apparatus as shown in FIG. 2B. The user, while checking the displayed contents on the display, can enter tracks on desired optical discs in the reproduction program.

To inform the user of the entered contents, the system controller 501 may be arranged to display the contents stored in the program memory unit 503, on the display of the user interface block unit 6 which are shown in FIG. 8. FIG. 8 shows the example of the displayed contents, including the disc accommodation location numbers, track numbers and the cumulative total of reproducing time associated with one another and listed according to the entered reproducing order.

The system controller 501 controls the turning of roulette drive unit 701 to select the tracks of the entered optical discs according to the program stored in the program memory unit 503, and executes the entered program.

Description will now be made for the application block unit 3. The application block unit 3 has the following four blocks.

(1) Main Video Decoder Unit 301

A main video decoder unit 301 demodulates main video data compressed based on the MPEG-2 (Moving Picture Experts Group 2) standard, and converts squeezed images compatible with wide television (aspect ratio of 9:16) into a maim video signal so as to be compatible with television pictures with the aspect ratio of 3:4.

(2) Sub Picture Decoder Unit 302

The sub picture decoder unit 302 demodulates sub picture data and coverts the data into a sub picture signal. The sub picture signal is mixed with the main video signal and then output.

(3) NTSC Encoder Unit 303

The NTSC encoder unit 303 converts the mixed video signal of the main video signal and the sub picture signal into a video signal of NTSC format. The NTSC encoder unit 303 controls analog copy guard and copy regulation of CGMS-A (Copy Generation Management System-Analog) to the video signal. The video signal encoded in NTSC format is output as a composite signal and a component signal.

(4) Audio Decoder Unit 304

The audio decoder unit 304 demodulates audio data, which has been compressed, multichanneled and modulated, or demodulates audio data, which has been modulated by linear PCM (Pulse Code Modulation). The demodulated audio data is converted by a digital-to-analogue converter into analogue audio signals of two (left and right) channels. In parallel with this, the demodulated audio data is output as a digital signal which conforms to the Digital Audio Interface Standard.

Next, description will be made for the process to be executed in entry of a reproduction program in the optical disc reproducing apparatus in the present embodiment. To enter the program, after the power supply to the optical disc reproducing apparatus is turned on, the program entry button on the user interface block unit 6 is pressed, by which the mode changes to the program entry mode, and the system controller 501 carries out the program entry process.

Figure 5:
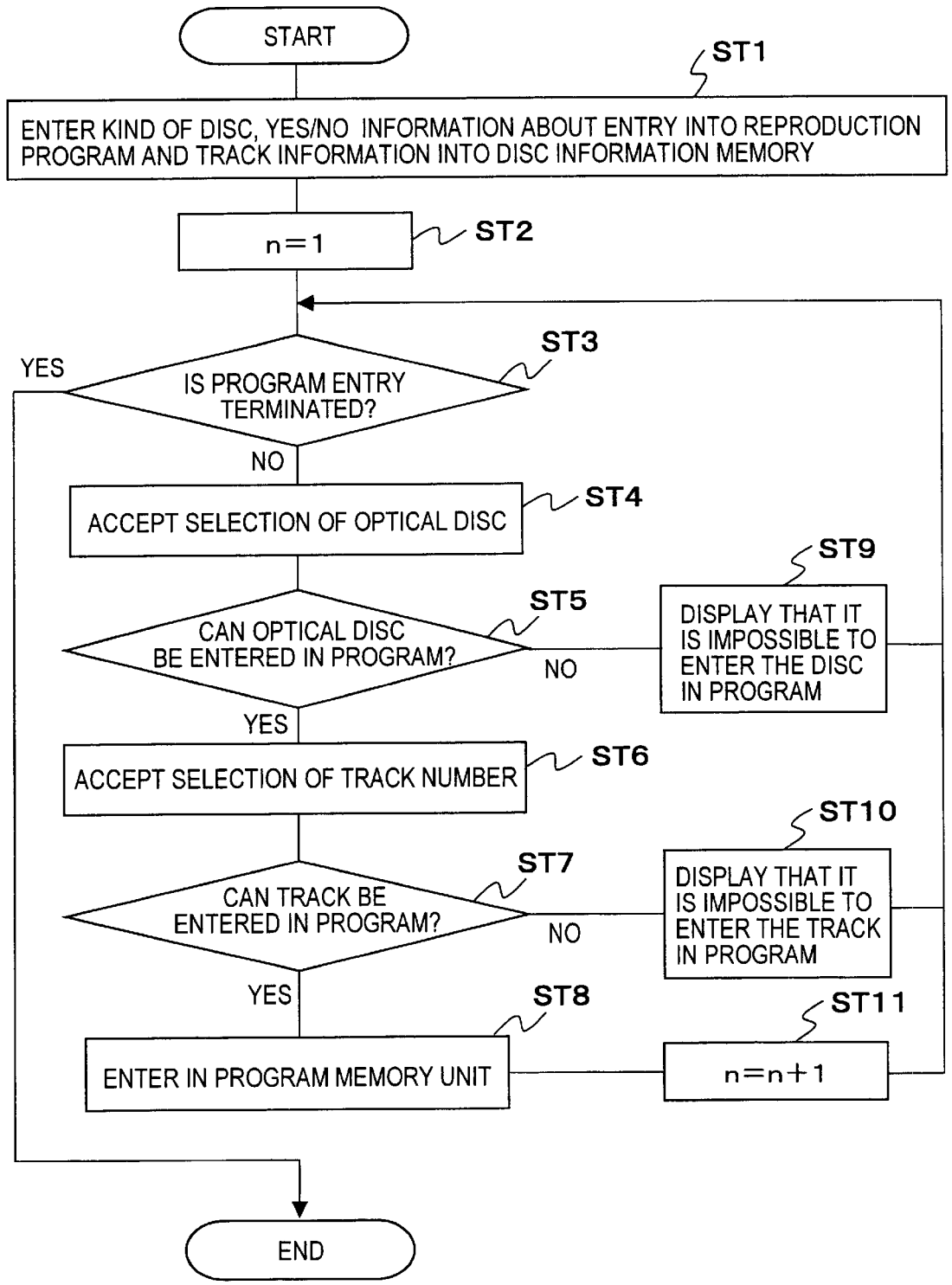
FIG. 5 is a flowchart of an entry process of the program in the optical disc reproducing apparatus according to the embodiment of the present invention.
Figure 6:
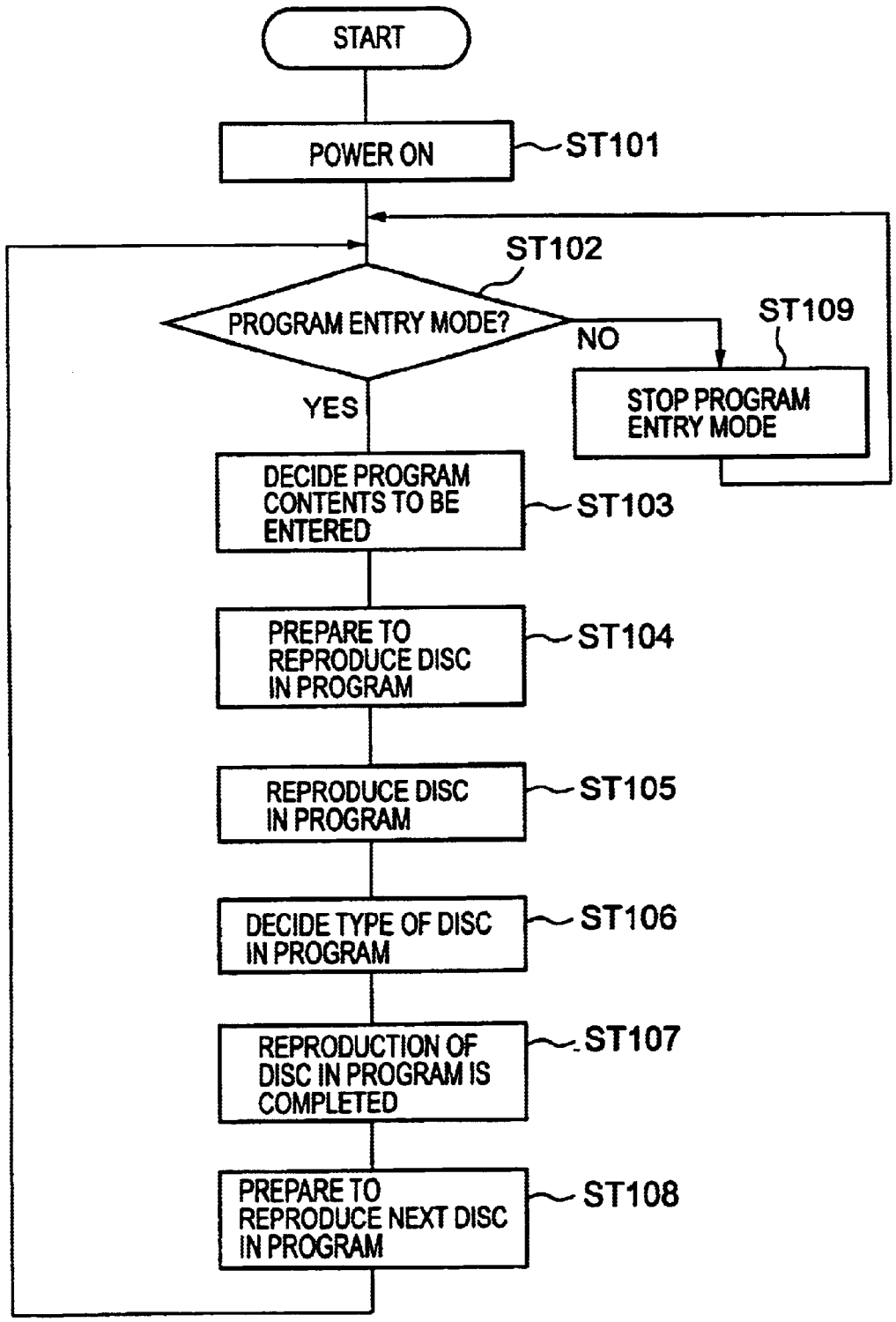
FIG. 6 is a flowchart showing a conventional process.
Figure 7:
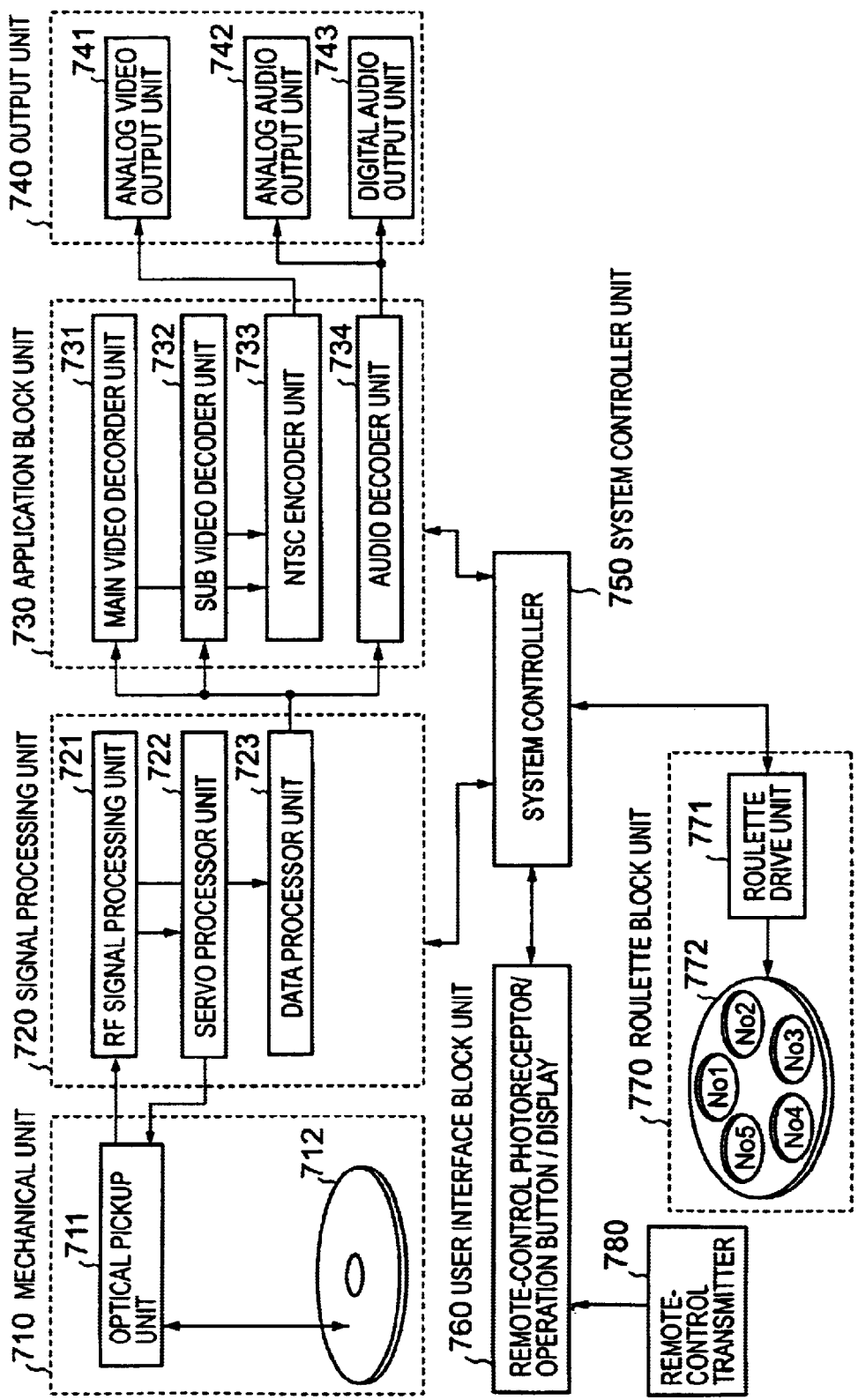
FIG. 7 is a block diagram of a conventional optical disc reproducing apparatus.

FIG. 5 is a flowchart showing the steps of program entry carried out by the system controller 501 after the apparatus enters in the program entry mode.

In the program entry mode, the system controller 501 loads an optical disc 103 into the mechanical unit 1, controls the disc detection unit 204 to check the types of all optical discs accommodated in the roulette block unit 702 to decide which discs can be entered in the program, to obtain track information, and stores decision results and obtained information in the disc information memory unit 502 (ST1).

The system controller 501 sets 1 for the reproducing order n in the program memory unit 503 (ST2).

Until accepting the user's instruction to terminate the program entry by pressing the operation button on the user interface 6, the system controller 501 repeats the following process (ST3).

When accepting the accommodation location number of an optical disc entered through the disc selector button or through the ten key pad on the user interface 6 (ST4), the system controller 501 refers to the program entry yes/no flag in the disc information memory unit 502 entered as entry yes/no information and decides whether or not the selected optical disc can be entered in the program (ST5).

If the yes/no flag is 0 in the step ST5, the system controller 501 decides that the disc cannot be entered in the program, and indicates that the selected optical disc cannot be entered in the program, on the display of the user interface 6 (ST9), and returns to the step ST3.

In the step ST5, when the yes/no flag is 1, the system controller 501 decides that the selected disc can be entered in the program, and asks the user to select a track number.

On accepting a track number selected through a track selector button or by the ten key pad on the user interface 6 (ST6), the system controller 501 refers to track information in the disc information memory unit 502, and decides whether or not the accepted track number can be entered in the program (ST7).

In the step ST7, if that track number is not stored, in other words, if the accepted track number is larger than the largest track number stored as track information about the optical disc in the disc information memory unit 502, the system controller 501 decides that that track cannot be entered in the program, and indicates that the selected track number cannot be entered in the program, on the display on the user interface 6 (ST10), and returns to the step ST3.

In the step ST7, if the track number is stored, in other words, when the accepted track number is smaller than or equal to the largest track number stored as track information about the optical disc in the disc information memory unit 502, the system controller 501 decides that the track can be entered in the program, obtains the recording time of the accepted track number from the disc information memory unit 502, and stores the accommodation location number of the optical disc, the track number, and the recording time as a reproducing order n in the program memory unit 503 (ST8).

The, the system controller 501 increments the reproducing order n by 1 (ST11), and returns to the step ST3.

By the steps mentioned above, the reproducing order is entered as a reproducing program in the program memory unit 503.

After this, when accepting an instruction to reproduce the program from the user, the system controller 501 reproduces information according to the reproducing order entered in the program memory unit 503.

Here, a list of track numbers and optical discs that can be entered in a program, after stored in the disc information memory unit 502 in the step ST1, may be displayed as shown in FIGS. 4A and 4B.

According to this embodiment, when entering tracks of desired optical discs in a program for programmed reproduction, the optical discs and the tracks that are unqualified for entry in the program for reasons mentioned above are not entered, with the result that the contents programmed by the user are reproduced with reliability. Therefore, reproduction is never interrupted by the appearance of an optical disc or a track that cannot be reproduced during programmed reproduction, so that programmed reproduction can be carried out with reliability.

In this embodiment of the present invention, description has been made for an optical disc reproducing apparatus of the roulette type as an example, but the present invention can be applied to optical disc reproducing apparatuses of the magazine type and the rack type other than the roulette type.

According to this embodiment, when an instruction is given by the user to enter an optical disc with the interactive function or with a track which track number is larger than the largest track number of an optical disc in a reproduction program, a message of "impossible to enter" can be displayed on the user interface block unit 6. In the present embodiment, optical discs and track numbers that can be entered are displayed so that it becomes possible to enter the tracks of optical discs that can be played in a programmed reproduction with reliability by referring the displayed information. Therefore, such a case can be precluded in which some tracks of optical discs cannot be played even though they have been entered in a reproduction program by the user.

According to this embodiment, when an instruction is given to enter an optical disc with the interactive function in a reproducing program, a notification can be issued to indicate that the optical disc cannot be entered in the program. In addition, when an instruction is given to enter a track number that is not stored in disc information memory unit, a notification can be issued to indicate that the track cannot be entered in the program.

According to the present invention, when a user enters information of an optical disc into a program for programmed reproduction, it never happens that optical discs unqualified for programmed reproduction, such as optical discs with the interactive function, are selected and entered in the program or tracks that do not exist are selected and entered in the program, so that the contents of the program can be reproduced just as they are entered by the user.

What is claimed is:

1. An optical disc reproducing apparatus capable of accommodating a plurality of optical discs and reproducing information recorded on an optical disc in a specified accommodation location, comprising:

disc detecting means for detecting types of said optical discs to determine whether or not said optical discs can be entered in a program;

disc type memory means for storing detection results of said disc detecting means, associated with disc accommodation location information indicating disc accommodation locations of respective discs;

accepting means for accepting an instruction to enter information recorded on said optical disc in the program to specify a reproducing order of the information; and output means for referring to said detection results stored in said disc type memory means and outputting a notification indicating that said information cannot be entered in said program, if said information specified by the instruction accepted by said accepting means is information recorded on an optical disc unable to be entered in said program.

2. The optical disc reproducing apparatus according to claim 1, wherein said output means displays a notification indicating that said information cannot be entered in the program, together with disc accommodation location information of the disc having said information recorded thereon.

3. The optical disc reproducing apparatus according to claim 1, wherein said output means, when said information specified by an instruction accepted by said accepting means is information recorded on an optical disc enterable in said program, outputs a notification indicating that said information can be entered.

4. An optical disc reproducing apparatus capable of accommodating a plurality of optical discs and reproducing information recorded on an optical disc in a specified accommodation location, comprising:

track number obtaining means for obtaining the largest track number of information recorded on an optical disc;

disc track memory means for storing the largest track number obtained by said track number obtaining means, associated with disc accommodation location information indicating disc accommodation locations of respective discs;

accepting means for accepting an instruction to enter the track of information recorded on said optical disc in a program to specify a reproducing order of tracks;

output means for referring to the largest track number stored in said disc track memory means, and outputting a notification indicating that a track cannot be entered in the program when the track number of said track specified in said instruction accepted by said accepting means is larger than the largest track number.

5. The optical disc reproducing apparatus according to claim 4, wherein said output means displays a notification indicating that said track cannot be entered in said program, together with disc accommodation location information about an optical disc having said track recorded thereon.

6. The optical disc reproducing apparatus according to claim 4, wherein said output means outputs information about tracks that can be entered in the program.

7. An optical disc reproducing apparatus capable of accommodating a plurality of discs and reproducing information recorded on an optical disc in a specified accommodation location, comprising:

disc detecting means for detecting a type of an optical disc, and deciding whether or not said optical disc can be entered in a program;

disc type memory means for storing detection results of said disc detecting means, associated with disc accommodation location information indicating disc accommodation locations of respective discs;

accepting means for accepting an instruction to enter information recorded on said optical disc in a program specifying a reproducing order of information; and output means for referring to said detection results stored in said disc type memory means and outputting a notification indicating that said optical disc can be entered, if the information specified by the instruction accepted by said accepting means is information recorded on an optical disc enterable in said program.

8. An optical disc reproducing apparatus capable of reproducing information recorded on an optical disc, comprising:

track number obtaining means for obtaining the largest track number of information recorded on an optical disc;

disc track memory means for storing the largest track number obtained by said track number obtaining means;

accepting means for accepting an instruction to enter the track of information recorded on said optical disc in a program to specify a reproducing order of tracks;

output means for referring to the largest track number stored in said disc track memory means, and outputting a notification indicating that a track cannot be entered in the program when the track number of said track specified in said instruction accepted by said accepting means is larger than largest track number.

* * * * *